Oct. 21, 1958 — R. W. TIMMERMAN ET AL — 2,857,250
METHOD OF PRODUCING CARBON DISULFIDE AND HYDROGEN SULFIDE BY THE REACTION OF SULFUR AND A HYDROGEN GAS
Filed June 6, 1955

INVENTORS:
Robert W. Timmerman
Albertus G. Draeger
John W. Getz

Oct. 21, 1958 R. W. TIMMERMAN ET AL 2,857,250
METHOD OF PRODUCING CARBON DISULFIDE AND HYDROGEN SULFIDE
BY THE REACTION OF SULFUR AND A HYDROGEN GAS
Filed June 6, 1955

INVENTORS:
Robert W. Timmerman
Albertus G. Draeger
John W. Getz

United States Patent Office

2,857,250
Patented Oct. 21, 1958

2,857,250

METHOD OF PRODUCING CARBON DISULFIDE AND HYDROGEN SULFIDE BY THE REACTION OF SULFUR AND A HYDROGEN GAS

Robert W. Timmerman, Charleston, and Albertus G. Draeger and John W. Getz, St. Albans, W. Va., assignors to Food Machinery and Chemical Corporation, New York, N. Y., a corporation of Delaware Application June 6, 1955, Serial No. 513,191

8 Claims. (Cl. 23—206)

This invention relates to an improvement in the process of producing carbon disulfide and hydrogen sulfide by the reaction of sulfur and a hydrocarbon gas consisting principally of methane.

In producing carbon disulfide and hydrogen sulfide by this process, as described, for example, in the United States Patent No. 2,330,934 to Carlisle M. Thacker, it has been the practice to heat the sulfur to vaporization temperature, heat the hydrocarbon gas to a temperature above the vaporization temperature of sulfur, mix the vaporized sulfur and the gas together and conduct the heated mixture at temperatures between about 450 to 700° C. through catalyst beds to cause reaction to produce carbon disulfide and hydrogen sulfide. Preferred reaction temperatures are between 550 and 700° C.

Due to the highly corrosive nature of sulfur gases at high temperature, it is desirable to operate the process at the lowest temperature consistent with good conversion yields. However, when sulfur vapors at temperatures between 550 and 700° C. are mixed with natural gas, or methane, at approximately the same temperature, a drop of from 20 to 35° C. in the combined gas temperature occurs due to the further dissociation of sulfur with the consequent absorption of heat. A temperature drop of from about 75° to about 125° C. also takes place in the reaction producing carbon disulfide and hydrogen sulfide and, in order to compensate for these two temperature drops, it has been necessary in practicing this process in accordance with the teachings of the prior art to heat the sulfur vapors to a temperature near the upper limit of the preferred reaction temperature, in order to secure a good conversion of the sulfur vapors and methane into the desired products.

One of the objects of the present invention is to provide a process of producing carbon disulfide and hydrogen sulfide in which sulfur vapor and methane may be heated to a lower temperature and still secure a high degree of conversion of said gases into carbon disulfide and hydrogen sulfide.

Another object of our invention is to provide a process of heating sulfur and methane together in which all of the sulfur may be vaporized at a lower temperature than if the sulfur is vaporized separately and then mixed with the heated methane.

Another object is to provide a process in which the temperature drop which occurs when sulfur vapor is mixed with heated methane will be avoided.

Various other objects and advantages of our invention will appear as this description proceeds.

In the following description the hydrocarbon gas will frequently be referred to as "methane" but it will be understood that any hydrocarbon gas consisting principally of methane may be used in the process, and that the term "methane" is to be understood as including hydrocarbon gases consisting principally of methane.

In the accompanying drawings, Fig. 1 indicates diagrammatically one embodiment of apparatus in which the process of our invention may be practiced.

Figures 1, 2:
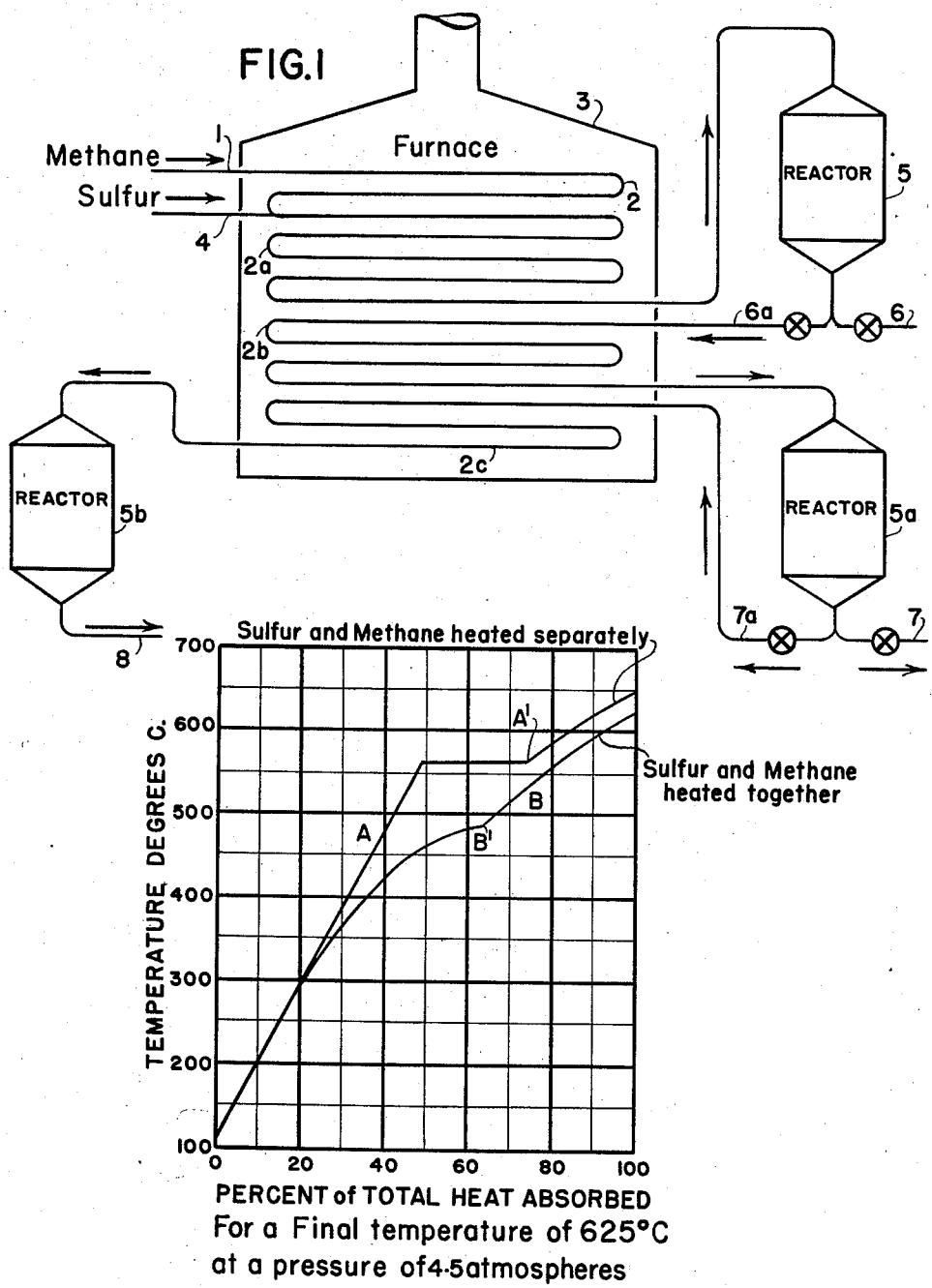
Fig. 2 is a chart showing the difference in percentage of heat absorbed when sulfur and a gas such as methane are heated separately and when heated together.

In the embodiment of the process according to Fig. 1, a hydrocarbon gas, designated as methane, flowing through the line 1 enters into direct contact with the first bank of tubes 2 in the furnace 3 and is heated to a temperature preferably at least 130° C. above the melting point of sulfur. Molten sulfur is pumped under suitable pressure through the line 4 and enters the tubes in the furnace 3 at a point where the methane has preferably reached a temperature in excess of 250° C., and thereafter flows concurrently with the methane through the bank of tubes 2a in the furnace 3, wherein the sulfur is vaporized in the presence of the methane and the sulfur-methane vapors heated to a temperature between 500 and 700° C. and passed through a catalyst bed reactor 5. In the reactor 5, the sulfur vapor and methane react to form carbon disulfide with a temperature drop of from about 75° to about 125° C. depending on the amount of reaction. The reaction products, together with unreacted sulfur and methane, may be passed through the line 6 into a recovery system for separation and recovery of the reaction products and unreacted raw materials.

We prefer, however, to pass the partially reacted gases through the line 6a back into the furnace 3, where they flow through another bank of tubes 2b and are again reheated to reaction temperature between 500 and 700° C., and passed through a second catalyst bed reactor 5a where further reaction between the unreacted sulfur and methane takes place with a consequent temperature drop. From the reactor 5a, the reaction products and unreacted sulfur and methane may be passed through the line 7 to a recovery system. We prefer, however, to pass the gases from reactor 5a through the line 7a into a third bank of tubes 2c in the furnace 3, where they are again reheated and passed into a third catalyst bed reactor 5b and then through the line 8 to the recovery system. The furnace 3 may be heated in any desired manner.

Fig. 2 shows the percentage of total heat absorbed versus the temperature of the gases to produce a final gas temperature of 625° C., at a pressure of 4.5 atmospheres, when sulfur and methane are heated in the ratio of 4 atoms of sulfur to 1 mol of methane, with both materials initially at the freezing point of sulfur, 120° C. In this figure, curve A shows the separate heating of methane and sulfur, and curve B shows the mixed heating of the two materials according to the principles of the present invention. As is shown by this chart, 50% of the total heat has been absorbed by the time the mixture of sulfur and methane has reached a temperature of 460° C., whereas when the streams of sulfur and methane are separately heated they must have reached a temperature of 565° C. to have absorbed 50% of the total heat added. As is shown by the points A' and B' in the curves A and B, in the mixed heating of sulfur and methane all the sulfur has been vaporized at the temperature of 490° C., at which point 63% of the total heat has been absorbed, whereas when the sulfur and methane are heated separately, complete vaporization of the sulfur does not take place until a temperature of 565° C. has been reached and 74% of the total heat has been added.

At 100% heat absorption, it is necessary that the separate streams be heated to about 650° C. in order that the combined streams of sulfur and methane will have a final temperature of 625° C., because of the drop in temperature on mixing vaporized sulfur with the gas stream, whereas when the sulfur and gas have been heated together as illustrated in curve B, it is not necessary that they be heated above 625° C. to secure a final temperature of 625° C. for passing into the catalyst bed reactors. This drop in temperature when sulfur is heated separately and mixed with heated methane is caused by further dissociation of the sulfur and the accompanying heat absorption which occurs when the partial pressure of the sulfur is decreased on mixing it with methane or other gas.

Figure 3:
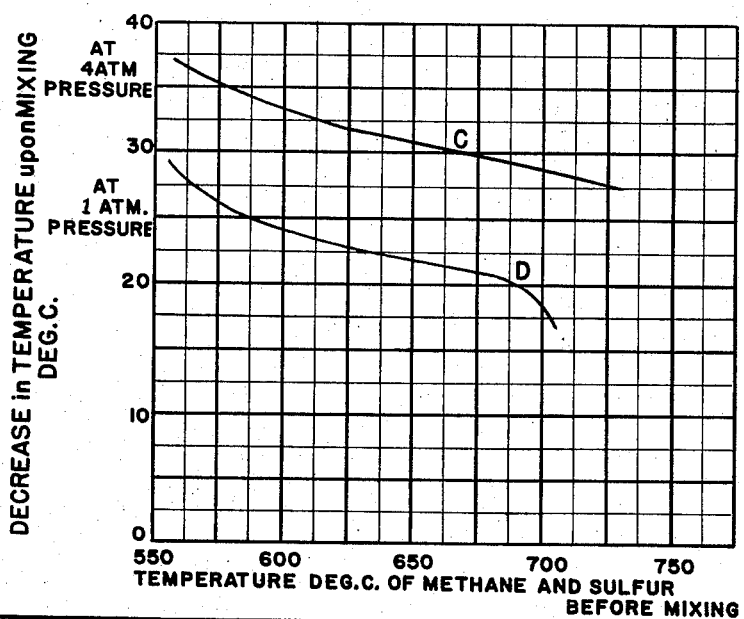
Fig. 3 is a chart showing the temperature drop when sulfur vapors and a gas, such as methane, are heated separately and mixed together.

Fig. 3 shows the decrease in temperature when 4 atoms of sulfur are mixed with 1 mol of methane or other gas at different temperatures and pressures. Curve C shows the temperature drop when the sulfur and gas are at a total pressure of 4 atmospheres, and curve D shows the temperature drop when the gases are at a total pressure of 1 atmosphere. In general, the temperature drop increases with increasing pressure, as is shown by comparing the two curves. The temperature drop is also greater at lower initial temperatures, because the sulfur vapor is less dissociated at lower temperature and hence becomes more dissociated when mixed with methane or other gas, and thereby absorbs more heat for a similar decrease in partial pressure.

The fact that a given degree of heat may be transferred to a mixed stream of sulfur and methane and retained therein for passage into catalytic converters at temperatures of 30 to 60° C. lower for the heating apparatus than when the sulfur and methane are heated separately and then mixed together, is of decided advantage in this process because of the decreased corrosion of the heater tubes and other equipment in the presence of sulfur vapor.

Figure 4:
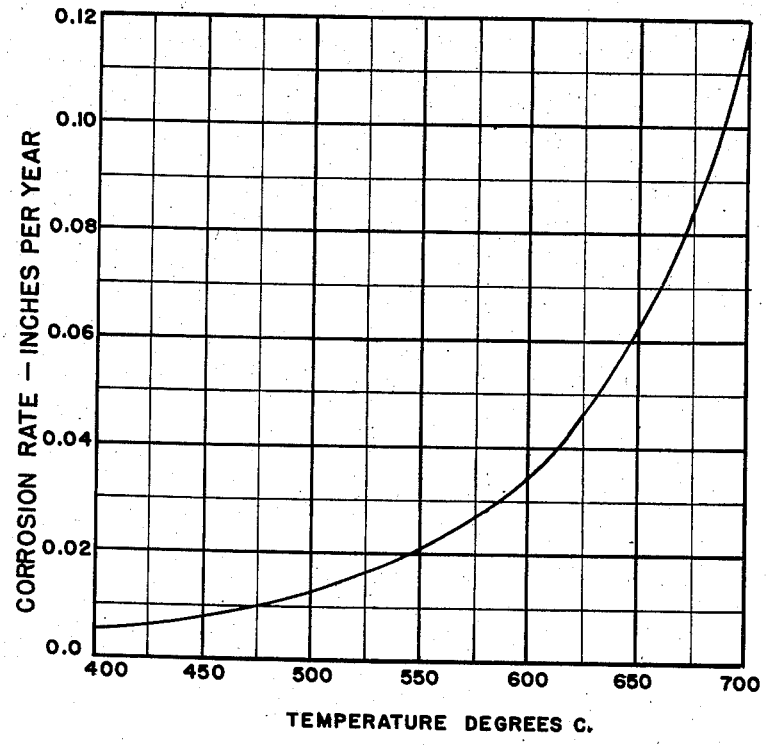
Fig. 4 is a chart showing the corrosion rate of a 25% chromium stainless steel in the presence of sulfur vapor at various temperatures.

Fig. 4 is a chart showing the corrosion rate of a 25% chromium stainless steel in inches per year (IPY) at various temperatures between 400 and 700° C. in the presence of sulfur vapor. This 25% chromium stainless steel, which is one of the most corrosion-resistant, economically usable metals for service in the presence of hot sulfur vapor, has a corrosion rate of .025 IPY at 570° C., which is twice as high as the corrosion rate of .0125 IPY at 500° C., and at 635° C. the corrosion rate is .05 IPY, which is twice as high as the corrosion rate at 570° C. or four times as high as the corrosion rate at 500° C. At 700° C., the corrosion rate is .115 IPY, which is more than five and one-half times greater than the corrosion rate at 500° C., so that a decrease in the temperature to which the sulfur vapors are heated means a decrease in corrosion rate and longer life for the equipment.

*Example*

The following illustrates one example of the advantage of the present process:

Methane at 25° C. was fed to a furnace at a rate of 85.6 mols per hour, where it was preheated to a temperature of 500° C. Sulfur at 150° C. then joined the methane stream at a flow rate of 331 atoms per hour, and the heating continued. The pressure was 5.4 atmospheres. At a temperature of 498° C. the sulfur had vaporized completely, and 71% of the total heat had been transferred to the process stream. Superheating was then effected to the final desired temperature of 611° C. If the methane and sulfur had been heated separately and then mixed, to achieve the same final conditions, the sulfur would not have been completely vaporized at the same pressure until its temperature had passed 583° C., at which point 84% of the total heat would have been transferred, and the separate streams would have to be heated to 645° C., 34° C. above the desired final temperature of 611° C., to preserve the temperature of 611° C. on mixing of the separate streams. In this example the average heating surface temperature was 665° C., at which temperature the corrosion rate was 0.075 IPY. If the sulfur and methane had been heated separately and then mixed, the average heating surface temperature would have been above 700° C., and the corrosion rate would have been above 0.115 IPY, or more than 53% higher than in the process as practiced according to this invention.

In one example of the practice of our invention, in the form of apparatus diagrammatically illustrated in Fig. 1, we prefer to conduct the sulfur and hydrocarbon gas, heated in the bank of tubes $2^a$, to a temperature of about 610° C., through the catalyst bed reactor 5 at a space velocity of about 486. Under these conditions, about 58% of the methane will react with the sulfur vapors in passing through the reactor 5 to produce carbon disulfide and hydrogen sulfide, and the temperature of the gases will drop about 124° C., to a temperature of about 486° C. At this temperature, the reaction rate becomes very low. The gases are then passed through the line $6^a$, back into the furnace 3, and are reheated in the bank of tubes $2^b$ to a temperature of about 625° C. and passed into the catalyst bed reactor $5^a$, where a further reaction to about 91%, based on the methane content of the gas, takes place with a temperature drop to 566° C. A third stage of reheating in the bank of tubes $2^c$ to a temperature of about 625° C. and passage through the reactor $5^b$ will produce a total reaction of about 98% of the methane with sulfur to produce carbon disulfide and hydrogen sulfide with a temperature drop to about 595° C. in reactor $5^b$. Space velocity in this example is the ratio of the total volume of the gases, sulfur assumed to be as $S_2$, at 0° C. and 760 mm. Hg pressure passing through the reactor per hour to the volume of the reactor.

By heating and reheating the sulfur in the presence of methane or hydrocarbon gas consisting predominantly of methane, it has not been necessary in the initial heating to exceed a temperature of about 610–611° C. There is no temperature drop due to mixing of sulfur vapor and methane at this point, so that the heated gases may be passed into the first reactor 5 and reheated and passed through the reactors $5^a$ and $5^b$ to produce a conversion yield of 98% based on the methane reacted without exceeding a temperature of about 625° C. In this way high conversion yields are possible without excessive corrosion of the equipment which comes into direct contact with the sulfur vapors.

Pressures of between 3 and 7 atmospheres are preferred for the operation of our process and temperatures of between about 450 and 700° C.

Although reactors 5, $5^a$ and $5^b$ have been described as catalyst bed reactors, sulfur and methane will react to produce carbon disulfide and hydrogen sulfide at temperatures between 450 and 700° C. without the use of catalytic materials and it is to be understood that reactors 5, $5^a$ and $5^b$ may contain non-catalytic porous packing or that non-catalytic reactions which produce carbon disulfide and hydrogen sulfide from sulfur and methane may be used in the practice of our invention.

While we have illustrated diagrammatically one method of practicing our invention and given one example of the practice of the invention under specific conditions of temperature, pressure, etc., therein stated, it will be understood that these are for illustrative purposes only and that various modifications and changes may be made from the illustrative example without departing from the spirit of our invention or the scope of the following claims.

We claim:

1. The method of producing carbon disulfide and hydrogen sulfide by the reaction of sulfur and a hydrocarbon gas which comprises melting the sulfur, heating the hydrocarbon gas while flowing through heated tubes in a furnace above the melting point of sulfur, mixing the molten sulfur and heated gas by pumping the molten sulfur into the heated gas stream flowing through said heated tubes in said furnace, heating the mixture in said tubes to vaporize the sulfur in the presence of said gas at a temperature approximately 75° C. below the temperature at which all the sulfur would have vaporized if heated alone, superheating the sulfur and gas mixture in said heated tubes to the temperature desired for the reaction of sulfur and methane to produce carbon disulfide and hydrogen sulfide, and passing the sulfur-gas mixture at the superheat temperature into contact with an otherwise unheated catalyst and causing said sulfur and hydrocarbon gas to react to produce carbon disulfide and hydrogen sulfide.

2. The method of producing carbon disulfide and hydrogen sulfide by the reaction of sulfur and a hydrocarbon gas which comprises melting the sulfur, heating the hydrocarbon gas flowing through heated tubes in a furnace above the melting point of sulfur, mixing the molten sulfur and heated gas by pumping the molten sulfur into the heated gas stream flowing through said heated tubes in said furnace, heating the mixture to vaporize the sulfur in the presence of said gas at a temperature approximately 75° C. below the temperature at which all the sulfur would have vaporized if heated alone, superheating the sulfur and gas mixture in said heated tubes to the temperature desired for the reaction of sulfur and methane to produce carbon disulfide and hydrogen sulfide in an unheated reactor, and causing said sulfur and hydrocarbon gas to react to produce carbon dissulfide and hydrogen sulfide.

3. In the production of carbon disulfide by the reaction of sulfur vapor and natural gas consisting principally of methane, the method which comprises heating sulfur to above 120° C. to melt the sulfur, heating methane flowing through heated tubes in a furnace to above 250° C., mixing the heated methane with the melted sulfur by pumping the molten sulfur into the heated gas stream flowing through said heated tubes in said furnace, heating the two together in said tubes to vaporize the sulfur in the presence of the methane at a temperature of about 450 to 525° C., superheating the sulfur-methane vapors to a temperature between 500 and 700° C., passing the sulfur-methane vapors into an unheated reactor and causing the sulfur and methane to react to produce carbon dissulfide and hydrogen sulfide, and maintaining the said reactants throughout the heating and reaction period under a pressure of 3 to 7 atmospheres.

4. In the production of carbon disulfide by the reaction of sulfur vapor and natural gas consisting principally of methane, the method of preventing a temperature drop in the gases which normally occurs on mixing sulfur vapor with heated methane which comprises heating sulfur to above its melting point, heating methane to a temperature of about 250° C., mixing the heated methane with the liquid sulfur, heating said mixture together at a pressure in excess of 3 atmospheres to approximately 450° C. to vaporize the sulfur in the presence of the methane, superheating the sulfur-methane vapors to a temperature between 500 and 700° C. passing the sulfur-methane vapors into an unheated reactor space and causing the sulfur and methane to react to produce carbon disulfide and hydrogen sulfide.

5. The method of preparing a superheated mixture of sulfur and hydrocarbon gas, for use in the production of carbon disulfide and hydrogen sulfide, which comprises heating the hydrocarbon gas to a temperature at least 130° C. above the melting point of sulfur, mixing the preheated gas with liquid sulfur, flowing said mixture at a pressure of at least 3 atmospheres through the tubes of a heater, heating said mixture in said tubes to a temperature of more than 100° C. above the temperature at which all the sulfur is vaporized and causing said mixture of sulfur vapor and hydrocarbon gas to react to produce carbon disulfide and hydrogen sulfide.

6. The method of producing carbon disulfide and hydrogen sulfide which comprises preparing a superheated mixture of sulfur and hydrocarbon gas by heating the hydrocarbon gas to a temperature at least 130° C. above the melting point of sulfur while flowing through heated tubes in a furnace, mixing the preheated gas with liquid sulfur by pumping the molten sulfur into the heated gas stream flowing through said heated tubes in said furnace, flowing said mixture at a pressure of 3 to 7 atmospheres through the heated tubes in said furnace, heating said mixture to a temperature of approximately 125° C. above the temperature at which all the sulfur is vaporized, and passing said heated mixture in contact with a catalyst to cause said sulfur vapor and hydrocarbon gas to react to produce carbon disulfide and hydrogen sulfide.

7. The method of producing carbon disulfide and hydrogen sulfide by the reaction of sulfur and a hydrocarbon gas which comprises melting the sulfur, heating the hydrocarbon gas above the melting point of sulfur while flowing through heated tubes in a furnace, mixing the molten sulfur and heated gas, heating the mixture in said heated tubes to vaporize the sulfur in the presence of said gas at a temperature approximately 75° C. below the temperature at which the sulfur would vaporize if heated alone, superheating the sulfur and gas mixture to a temperature of about 610° C., passing said superheated gases through an unheated catalyst bed reactor and causing said gases to react to produce carbon disulfide and hydrogen sulfide with a consequent drop in temperature, reheating said gases and passing said gases through a second unheated catalyst bed reactor and causing further reaction between the sulfur and methane in said gases to produce more carbon disulfide and hydrogen sulfide with another drop in temperature, reheating said gases and passing said gases through a third unheated catalyst bed reactor to produce more carbon disulfide and hydrogen sulfide and keep the highest temperature of said gases below about 650° C.

8. In the production of carbon disulfide by the reaction of sulfur vapor and natural gas consisting principally of methane, the method of preventing a temperature drop in the gases, which normally occurs on mixing sulfur vapor with heated methane, which comprises heating sulfur to above its melting point, heating methane to a temperature of about 250° C., mixing the heated methane with the liquid sulfur, flowing said mixture through heated tubes in a furnace while heating said mixture together to a temperature of about 450 to 525° C., at a pressure of about 4 atmospheres, to vaporize the sulfur in the presence of the methane, super-heating the sulfur-methane vapors to a temperature of about 610° C. and passing said gases through a catalyst bed reactor to produce carbon disulfide and hydrogen sulfide with a consequent drop in temperature, reheating said gases above 610° C. and passing said reheated gases through a second catalyst bed reactor to produce more carbon disulfide and hydrogen sulfide with another drop in temperature, reheating said gases above 610° C. and passing said reheated gases through a third catalyst bed reactor to produce more carbon disulfide and hydrogen sulfide.

References Cited in the file of this patent

UNITED STATES PATENTS

| | | |
|---|---|---|
| 2,378,651 | Matuszak | June 19, 1945 |
| 2,556,430 | Marisic | June 12, 1951 |

UNITED STATES PATENT OFFICE
CERTIFICATE OF CORRECTION

Patent No. 2,857,250                                                    October 21, 1958

Robert W. Timmerman et al.

It is hereby certified that error appears in the above numbered patent requiring correction and that the said Letters Patent should read as corrected below.

In the drawings, sheets 1 and 2, line 3, and in the heading to the printed specification, line 4, in each occurrence, for that portion of the title reading "HYDROGEN GAS" read -- HYDROCARBON GAS --.

Signed and sealed this 12th day of May 1959.

(SEAL)
Attest:

KARL H. AXLINE                                        ROBERT C. WATSON
Attesting Officer                                   Commissioner of Patents